United States Patent [19]

Matsuda et al.

[11] 4,409,339
[45] Oct. 11, 1983

[54] HYDROPHILIC SULFONATED POLYOLEFIN POROUS MEMBRANE AND PROCESS FOR PREPARING THE SAME

[75] Inventors: Kazuo Matsuda; Mitsuo Kohno, both of Yokohama; Yoshinao Doi, Moriyama, all of Japan

[73] Assignee: Asahi Kasei Kogyo, Osaka, Japan

[21] Appl. No.: 194,341

[22] Filed: Oct. 6, 1980

[30] Foreign Application Priority Data

Oct. 16, 1979 [JP] Japan ................... 54-132460

[51] Int. Cl.$^3$ ............... C08F 110/00; C08F 8/36; B01J 47/12
[52] U.S. Cl. .................... 521/143; 521/27; 521/33; 521/145
[58] Field of Search ............ 521/27, 143, 145

[56] References Cited

U.S. PATENT DOCUMENTS 3,375,208  3/1968  Duddy ..................... 521/27
3,821,127  6/1974  Mizutani ................. 521/27
4,256,845  3/1981  Morris et al. ........... 521/145
4,265,959  5/1981  Sano et al. .............. 521/27

Primary Examiner—Joseph L. Schofer
Assistant Examiner—Peter F. Kulkosky
Attorney, Agent, or Firm—Armstrong, Nikaido, Marmelstein & Kubovcik

[57] ABSTRACT

A sulfonated polyolefin porous membrane containing sulfonic groups in an amount, in terms of exchange capacity, of 0.05 to 1 milliequivalent per gram of the sulfonated polyolefin and having a porosity of 30 to 85% and an average pore diameter of 0.05 to 1$\mu$ has been found to be excellent in water permeability, removal capability, water-permeability retention, mechanical strength and elongation, etc. The porous membrane of the present invention may advantageously be employed as a fine microfilter or the like. The porous membrane of the present invention may be easily prepared by treating with a sulfonating agent a polyolefin porous membrane preferably containing an inorganic filler which is subsequently extracted from the membrane.

4 Claims, No Drawings

HYDROPHILIC SULFONATED POLYOLEFIN POROUS MEMBRANE AND PROCESS FOR PREPARING THE SAME

The present invention relates to a porous membrane and a process for preparing the same. More particularly, the invention relates to a sulfonated polyolefin porous membrane which has a high water permeability, an excellent removal capability, a high water-permeability retention and a good chemicals resistance, and also relates to a process for the preparation of the same. Such a porous membrane is very useful particularly for the filtration treatment of raw water and aqueous liquids.

A marked progress has been made in the technical field of porous membranes made of polymer materials especially in recent years. Particularly, porous membranes having an open or interconnected pore structure have been used more and more widely as various kinds of filter elements. Among such porous membranes, porous membranes made of hydrophilic polymers have excellent performances as fine microfilters employed for the preparation of pure water used in the field of the electronic industry and for the removal of bacteria or fungi from raw water to provide water usable in the production of medical and pharmaceutical products.

As specific examples of hydrophilic polymers that are used for the production of such porous membranes, there can be mentioned cellulose, cellulose derivatives, polyvinyl formal prepared by reacting polyvinyl alcohol with formaldehyde, polyamides, and the like. Cellulose and cellulose derivatives are poor in resistance to both alkalis and acids, while polyvinyl formal and polyamides are poor in resistance to acids. Accordingly, each of porous membranes made of these polymers is restricted in its uses which may depend upon whether an aqueous liquid to be subjected to filtration is acidic or alkaline. On account of their affinity for water and aqueous liquids, the porous membranes made of hydrophilic polymers are well suited for use in filtration of raw water and aqueous liquids but are liable to be swollen and softened by either of raw water and aqueous liquids, leading to physical or morphological changes of the membranes which result in compaction of the membranes, by which the volume of the pores of the membranes is diminished. Therefore, the water permeability of the porous membranes is gradually lowered during the course of filtration. Such gradual lowering in water permeability of the porous membranes, which lowering can be evaluated in terms of water-permeability retention, is conspicuous when the filtration is conducted under high pressures.

With a view to solving the above-mentioned problems accompanying the use of porous membranes made of hydrophilic polymers, we have made intensive researches focused on surface-hydrophilic porous membranes and the preparation thereof from porous membranes made of hydrophobic polymers, and found that the problems can be solved by the use of a porous membrane prepared from a hydrophobic polyolefin porous membrane by sulfonating the same to render it hydrophilic in the outer surfaces and inner surfaces surrounding the pores. Further, we have found that such a sulfonated polyolefin porous membrane is unexpectedly improved in removal capability (ability to trap or remove particulate matters). Based on such findings, we have completed the present invention. It is especially to be noted that the technique of rendering the surfaces of a hydrophobic membrane hydrophilic has never been known in the field of porous membranes apart from the field of semipermeable membranes.

More specifically, in accordance with one aspect of the present invention, there is provided a porous membrane which consists essentially of a sulfonated polyolefin containing sulfonic groups in an amount, in terms of exchange capacity, of 0.05 to 1 milliequivalent per gram of the sulfonated polyolefin, and which has a porosity of 30 to 85% and an average pore diameter of 0.05 to 1μ.

The porous membrane of the present invention is most strongly characterized in that it is made of a polyolefin having sulfonic groups bonded thereto in such a specific amount described above in terms of exchange capacity that the membrane has not only a high water permeability and a high retention of water permeability but also a much improved removal capability which may be attributed to such a property quite peculiar to the porous membrane of the present invention that it can unexpectedly trap or remove even particulate matters smaller in diameter than the pores of the membrane. Further, the porous membrane of the present invention is quite well resistant to chemicals.

In general, most important factors to be considered when a porous membrane is used as a microfilter are its liquid permeability (quantity of a liquid which the membrane of unit area allows to pass therethrough under unit pressure for unit time) and removal capability. It is no exaggeration to say that the two factors substantially determine the performance of a porous membrane as a microfilter. Generally speaking, however, the liquid permeability and removal capability are, in principle, incompatible with each other. That is, in order to increase the removal capability of a porous membrane, the diameters of the pores of the porous membrane must be designed to be smaller on the average, with the result that, however, the liquid permeability of the membrane is, in turn, reduced. In view of the above, it is easily understood that the porous membrane according to the present invention, in which the removal capability is improved without sacrificing the liquid permeability (water permeability in the case of the porous membrane of the present invention), will perform as an ideal microfilter beyond usual expectation. The porous membrane of the present invention is also very excellent in water-permeability retention, which is another important factor to be considered when the membrane is used as a microfilter.

As specific examples of polyolefins to be used as the raw material of the porous membrane of the present invention, there can be mentioned polyethylene, polypropylene, polybutene and mixtures thereof, and copolymers of two or more kinds of monomers selected from ethylene, propylene, butene, hexene and tetrafluoroethylene. Of the above-mentioned polyolefins, polyethylene and polypropylene are especially preferred because of their excellent moldability and processability, high chemicals resistance, and high mechanical strength and elongation.

Generally speaking, the pore structure, average diameter of the pores and porosity of a porous membrane have significant meanings. The pore structure and average diameter of the pores of the membrane have great influences on the removal capability of the membrane while the porosity has a great influence on the water permeability of the membrane.

The porous membrane of the present invention has an average pore diameter of 0.05 to 1μ, preferably 0.1 to 0.8μ. The porous membrane of 0.05 to 1μ in average pore diameter according to the present invention belongs to those used as a fine microfilter according to the common classification. The porous membrane of the present invention can be used for the removal of minute particles, bacteria or fungi and the like from raw water and aqueous liquids, for the removal of corpuscles from blood, and so on since it can trap or remove particulate matters of 0.04 to 0.8μ in particle size. For trapping or removing such particulate matters, the range of 0.05 to 1μ in average pore diameter which range is specified with respect to the porous membrane according to the present invention will suffice due to the improved removal capability of the membrane attributed to such a peculiar property that the membrane can trap or remove particulate matters even smaller in diameter than the pores of the membrane. Therefore, the porous membrane according to the present invention is superior in water permeability to a conventional porous membrane when both of the membranes are designed to have the same porosity and removal capability, while the porous membrane according to the present invention gives a higher removal capability than a conventional porous membrane when both of the membranes are designed to have the same porosity and water permeability. This is a great advantage of the porous membrane of the present invention over conventional porous membranes.

The porosity of the porous membrane of the present invention is in the range of from 30% to 85%, preferably in the range of from 50% to 80%, from the viewpoints of permissible balance of mechanical strength and elongation with water permeability. It is noted that conventional porous membranes commonly used as a fine microfilter generally have a porosity of 50% to 85%. By virtue of the above-mentioned great advantage, the porous membrane of the present invention may have a lower porosity than those of the conventional porous membranes for achieving the same water permeability and removal capability as those of the conventional porous membranes. This will add not a little to the value of the porous membrane of the present invention from the viewpoint of mechanical strength and elongation. When the porosity of a porous membrane is less than 30%, the porous membrane is too low in water permeability to be useful as a fine microfilter though it possesses an excellent mechanical strength and elongation. On the other hand, a porous membrane having a porosity of more than 85% is too poor in mechanical strength and elongation to be practically useful though it possesses an excellent water permeability.

The porous membrane of the present invention which is preferably of 0.01 to 10 mm in thickness usually has an open or interconnected pore structure having a network of meandering passages composed of the pores which provide the hereinbefore-specified porosity and average pore diameter.

The porous membrane of the present invention consists essentially of a sulfonated polyolefin which is required to contain sulfonic groups in an amount, in terms of exchange capacity, of 0.05 to 1 milliequivalent, preferably of 0.1 to 0.7 milliequivalent, per gram of the sulfonated polyolefin from the viewpoint of good balance of water permeability and removal capability with water-permeability retention (resistance against compaction), and mechanical strength and elongation. It is well known that a hydrophobic polymer is generally rendered more hydrophilic and poorer in mechanical strength and elongation as the polymer is sulfonated to a greater extent. This also applies to the case where a porous membrane made of a hydrophobic polymer is sulfonated. That is, the porous membrane made of the hydrophobic polymer is rendered more hydrophilic and poorer in mechanical strength and elongation with the advance of sulfonation of the porous membrane.

The relationship between the amount, in terms of exchange capacity, of sulfonic groups contained in a porous membrane and the performance of the porous membrane will be described in more detail as follows. In the course of sulfonation of a porous membrane to render the same hydrophilic, the density of sulfonic groups present in the inner surfaces surrounding the pores is saturated at the end of a given sulfonation time, and, thereafter, the introduction of sulfonic groups into the body (matrix) of a polyolefin constituting the porous membrane takes place. In principle, even if only the outer surfaces and inner surfaces (surrounding the pores) of a porous membrane are hydrophilic by the sulfonation thereof, the porous membrane allows water or an aqueous liquid to pass therethrough with ease (the easiness can be evaluated by the water permeability of the porous membrane). In this sense, the sulfonated polyolefin constituting the porous membrane has only to contain sulfonic groups at least in a certain amount in terms of exchange capacity. The density of sulfonic groups present in the outer surfaces and inner surfaces (surrounding the pores) of a porous membrane has a great influence on the removal capability of the membrane. On the other hand, it is noted that the sulfonic groups contained in the body of the polyolefin may have little to do with the removal capability of the porous membrane. Accordingly, it is easily understood that, in connection with the removal capability of the porous membrane, the sulfonated polyolefin constituting the porous membrane has only to contain sulfonic groups at least in a certain amount in terms of exchange capacity. It is noteworthy that the lower limit of amount, in terms of exchange capacity, of sulfonic groups contained in the sulfonated polyolefin constituting the porous membrane can be specified, either from the viewpoint of water permeability or from the viewpoint of removal capability, to be of substantially equal value. The amount, in terms of exchange capacity, of sulfonic groups contained in the sulfonated polyolefin constituting the porous membrane has a great influence on the water-permeability retention of the porous membrane. Too large an amount, in terms of exchange capacity, of sulfonic groups, which will result from the extensive introduction of sulfonic groups into the body of a polyolefin attributed to excessive sulfonation of a porous membrane comprising the polyolefin, causes the porous membrane to swell in water or an aqueous liquid to a large extent, thus resulting in poor water-permeability retention of the membrane. Thus, the upper limit of amount, in terms of exchange capacity, of sulfonic groups contained in the sulfonated polyolefin constituting the porous membrane must be specified from the viewpoint of avoiding or minimizing the swelling of the porous membrane in water or an aqueous liquid thereby to provide a high water-permeability retention. The upper limit of amount, in terms of exchange capacity, of sulfonic groups must also be specified from the viewpoint of securing the minimum mechanical strength and elongation required of a porous membrane for enabling the same to be practically useful, in view of the fact that the mechanical strength and elongation of the porous membrane decreases with increase in the amount, in terms of exchange capacity, of sulfonic groups as described hereinbefore. From the foregoing, the amount, in terms of exchange capacity, of sulfonic groups contained in the sulfonated polyolefin constituting the porous membrane of the present invention which, more conceptually speaking, has a specified density of sulfonic groups per unit surface area must be within a specific range, i.e. in the range of 0.05 to 1 milliequivalent per gram of the sulfonated polyolefin. When the amount, in terms of exchange capacity, of sulfonic groups is less than 0.05 milliequivalent per gram of the sulfonated polyolefin, the porous membrane is too poor in hydrophilic nature to have a sufficient water-permeability and removal capability though it is excellent in mechanical strength and elongation, and in water-permeability retention. When the amount, in terms of exchange capacity, of sulfonic groups is more than 1 milliequivalent per gram of the sulfonated polyolefin, the porous membrane is poor in mechanical strength and elongation, and in water-permeability retention though it is excellent in water-permeability and removal capability.

As is apparent from the foregoing, it is preferred that the porous membrane of the present invention have such a composite structure that the sulfonic groups are present substantially only in the outer surfaces of the porous membrane and the inner surfaces surrounding the pores and substantially no sulfonic groups are present in the great majority of the body (matrix) of the polyolefin constituting the porous membrane.

The porous membrane of the present invention may be in any shape, for example, in the shape of a flat film or sheet, or a fiber, especially a hollow fiber.

The porous membrane of the present invention having the foregoing characteristic features exhibits excellent performances when it is used not only as a fine microfilter for removing minute particles, bacteria or fungi, and the like present in raw water or in an aqueous liquid, but also as a blood plasma-separating diaphragm and as a battery separator.

According to another aspect of the present invention, there is provided a process for preparing a porous membrane having a porosity of 30% to 85% and an average pore diameter of 0.05 to 1$\mu$, which comprises treating with a sulfonating agent a porous membrane consisting essentially of a polyolefin and an inorganic filler or a porous membrane consisting essentially of a polyolefin, the treatment being carried out so that the resulting sulfonated polyolefin contains sulfonic groups in an amount, in terms of exchange capacity, of 0.05 to 1 milliequivalent per gram of the sulfonated polyolefin, and extracting the inorganic filler in case the porous membrane treated contains the inorganic filler.

According to the process of the present invention, a polyolefin porous membrane having an open or interconnected pore structure with a network of meandering passages of the pores is treated with a sulfonating agent to provide a novel sulfonated polyolefin porous membrane as described hereinbefore which has a high water permeability, an improved removal capability, a high water-permeability retention and a good chemicals resistance.

In the process of the present invention, there may be employed as the starting material either a porous membrane consisting essentially of a polyolefin and an inorganic filler or a porous membrane consisting essentially of a polyolefin, which may be prepared according to any method known in the art, for example, the method as disclosed in Japanese Patent Application Laid-Open No. 156,776/1977 (corresponding to German Patentschrift No. 26 27 229) or the method as disclosed in Japanese patent application Laid-Open No. 52,167/1979 (corresponding to U.S. Pat. No. 4,190,707). The porosity and average pore diameter of a porous membrane to be used as the starting material may usually be substantially the same as those of the desired porous membrane to be prepared from the starting membrane according to the process of the present invention on the assumption that, in the case of the starting porous membrane consisting essentially of a polyolefin and an inorganic filler, said porosity and average pore diameter are based on both of the actual pores and the prospective pores which are to turn real pores after the inorganic filler is extracted. In the case of the starting porous membrane consisting essentially of a polyolefin alone, therefore, its porosity and average pore diameter may be in the range of about 30% to about 85% and in the range of about 0.05$\mu$ to about 1$\mu$, respectively. In the case of the starting porous membrane consisting essentially of a polyolefin and an inorganic filler, its actual porosity and average pore diameter are, of course, dependent on the amount of the inorganic filler contained therein, but preferably in the range of about 20% to about 70% and in the range of about 0.01$\mu$ to about 0.03$\mu$, respectively. The inorganic filler is preferably of finely divided particles or porous particles having an average particle diameter ranging from 0.005 to 0.5$\mu$ and a specific surface area a of 50 to 500 m$^2$/g. As representative examples of the inorganic fillers, there can be mentioned silica, calcium silicate, aluminum silicate, alumina, calcium carbonate, magnesium carbonate, kaolin clay and diatomaceous earth. They may be employed alone or in combination. Of the above-mentioned fillers, silica is most preferred.

Examples of the sulfonating agent to be used in the process of the present invention include fuming sulfuric acid (containing 1 to 60% by weight of free SO$_3$), chlorosulfonic acid, 100% sulfuric acid and solutions of sulfur trioxide dissolved in a suitable solvent such as dichloromethane, dichloroethane, tetrachloroethane, chloroform or tetrachloroethylene. Fuming sulfuric acid is most preferred from the viewpoints of reactivity, metal-corrosiveness and easiness in waste liquor disposal.

The sulfonating reagent concentration in the reaction medium and the reaction temperature and time are appropriately chosen for obtaining a porous membrane consisting essentially of a polyolefin having sulfonic groups bonded thereto in an amount, in terms of exchange capacity, of 0.05 to 1 milliequivalent per gram of the sulfonated polyolefin. The reaction or treatment temperature cannot be specified independently, but is generally up to 60° C., more preferably 0° to 50° C., from the viewpoint of avoidance of side reactions which may impair the properties of the resulting porous membrane. The reaction or treatment time cannot also be specified independently, but is generally as short as 1 minute to 3 hours, more preferably 2 minutes to 2 hours, from the viewpoints of the industrial scale production of hydrophilic porous membranes and the preferred sulfonation of the membranes substantially only in the outer surfaces and inner surfaces (surrounding the pores) thereof. The preferred concentration of free SO$_3$ in fuming sulfuric acid is in the range of 2 to 30% by weight, especially in the range of 10 to 25% by weight, whereas the preferred sulfur trioxide concentration in a solution of sulfur trioxide in a solvent is in the range of 2 to 30% by weight, especially in the range of 10 to 20% by weight.

A porous membrane to be treated with a sulfonating agent according to the process of the present invention is desired to be so readily wettable by the sulfonating agent that, upon contact with the porous membrane, the sulfonating agent can not only readily wet the outer surfaces of the membrane but also readily soak through the pores of the membrane to wet the inner surfaces surrounding the pores, whereby the sulfonation reaction takes place uniformly all over the whole surfaces of the membrane comprising the outer and inner surfaces. In the case of a porous membrane having little wettability by a sulfonating agent, the sulfonating agent cannot soak through the pores of the membrane even though it can wet the outer surfaces of the membrane, with the result that only the outer surfaces of the membrane may be sulfonated but the inner surfaces surrounding the pores of the membrane may remain un-sulfonated. Of course, with the advance of sulfonation, the inner surfaces surrounding the pores of the membrane will be sulfonated little by little until the membrane is sulfonated in its entirely. However, as described hereinbefore, the porous membrane excessively sulfonated may be too poor in mechanical strength and elongation to be put into practical use. Accordingly, it is preferred that a porous membrane to be treated with a sulfonating agent according to the process of the present invention should consist essentially of a polyolefin and an inorganic filler which makes the membrane readily wettable by the sulfonating agent. In the case where a porous membrane consisting essentially of a polyolefin alone is to be treated with such a sulfonating agent as fuming sulfuric acid or 100% sulfuric acid, it is preferred that the porous membrane be subjected, before sulfonation thereof, to a preliminary treatment for rendering the membrane readily wettable by the sulfonating agent. For example, such a preliminary treatment may be carried out by dipping the porous membrane in a solution of a surface active agent in a solvent such as methanol.

The term "sulfonic groups" used herein is intended to indicate those represented by the formula $-SO_3M$ wherein M is H or a cation capable of forming a salt with $-SO_3H$, e.g., Na, K, Ca, Mg, $NH_4$ or Li.

Here, it is intended that the amount, in terms of exchange capacity, of sulfonic groups contained in a porous membrane is equal to the salt-splitting capacity (milliequivalent/gram) of the membrane, the measurement of which is described later.

The present invention will now be described in more detail with reference to the following Examples that should not be construed as limiting the scope of the invention.

The properties shown herein are measured according to the following methods.

Porosity (%):

$$\text{Porosity (\%)} = \frac{\text{pore volume}}{\text{membrane volume}} \times 100$$

[Pore volume (cc): determined by means of a mercury penetration porosimeter, on which the detailed explanation will be given later]

Average pore diameter ($\mu$):

This is a value of pore diameter providing half the value of total pore volume in an integral curve of pore diameter-cumulative pore volume which is obtained by using the mercury penetration porosimeter.

Salt-splitting capacity (milliequivalent/gram):

A porous membrane in the sulfonic acid state is dipped in a 1N aqueous solution of calcium chloride until the equilibrium is established. Hydrogen chloride formed in the solution is titrated with an about 0.1N aqueous solution of caustic soda (titer: f) by using phenolphthalein as the indicator.

$$\text{Salt-splitting capacity (milliequivalent/gram)} = \frac{1/10 \cdot f \cdot X}{Wd}$$

wherein f is the titer of the about 0.1N aqueous solution of caustic soda, X is the volume of the about 0.1N aqueous solution of caustic soda consumed in the titration, and Wd is the weight of the dry porous membrane in the calcium salt state.

Water permeability (liter/$m^2$.hr.atm):

Determined under a pressure difference of 1.033 Kg/$cm^2$ and at a temperature of 25° C.

Water-permeability retention (%):

The water permeability of a porous membrane was determined before and after 1 hour's use in water permeation of the porous membrane under a pressure difference of 5 Kg/$cm^2$ and at a temperature of 20° C.

Water-permeability retention (%) =

$$\frac{\text{water permeability after 1 hour's use}}{\text{water permeability before use}} \times 100$$

Removal capability (%):

A polystyrene latex with a solids content of 10% by weight [Dow Uniform Latex Particles (trade name) manufactured and sold by the Dow Chemical Company, U.S.A.] is diluted with distilled water to prepare a dispersion (A) with a solids content of 0.1% by weight.

Dispersions having varied solids contents (usually, 0.1/2% by weight, 0.1/5% by weight, 0.1/10% by weight, 0.1/30% by weight and 0.1/50% by weight) are prepared by diluting the dispersion (A) with distilled water. Using the dispersions, there is obtained a calibration curve showing the relationship between the solids contents of the dispersions and the amounts of light passed through each of the dispersions which amounts are measured by means of a digital haze meter manufactured by Nihon Denshoku Kogyo K.K., Japan.

The dispersion (A) is filtrated by means of a porous membrane. The filtrate is examined by means of the haze meter with respect to the amount of light passed through the filtrate, from which the solids content of the filtrate is found with reference being made to the calibration curve.

$$\text{Removal capability (\%)} = \frac{C_F - C_P}{C_F} \times 100$$

wherein $C_F$ is the solids content of the dispersion A, and $C_P$ is the solids content of the filtrate.

Tensile break strength (Kg/cm²) and Tensile break elongation (%):

Determined according to ASTM-D-882 using an Instron type universal tester (an initial strain rate = 2.0 mm/mm.min)

Explanation on mercury penetration porosimeter:

Mercury is forced, under increasing pressure, into the pores of a porous membrane to be measured. The pore volume is determined from the amount of mercury occluded in the pores of the sample. The pore diameter is calculated on the principle that the diameter of a pore is in inverse proportion to the pressure necessary for forcing mercury into the pores. This measurement method is detailed in Chapter 10 of "Fine Particle Measurement" written by Clyde Orr, Jr. and J. M. Dallavalle and published by The Macmillan Company, New York in 1959, and also in "Industrial and Engineering Chemistry" vol. 17, No. 12, 1945, p. 782 to 786, written by H. L. Ritter and L. C. Drake.

The measurement may be conducted basically in accordance with ANSI/ASTM D2873-70 (Reapproved 1976), using a Mercury Penetration Porosimeter, Model 905-1 (manufactured and sold by Micrometrics Instrument Corporation, U.S.A.). Penetration volume readings may be obtained by forcing mercury into the pores at the pressure (psi) in the following list:-

| | | | | |
|---|---|---|---|---|
| 14.7 | 100 | 450 | 2,000 | 10,000 |
| 20 | 125 | 650 | 3,000 | 15,000 |
| 35 | 175 | 850 | 4,000 | 20,000 |
| 45 | 250 | 1,150 | 5,000 | 30,000 |
| 85 | 350 | 1,500 | 7,000 | 40,000 |
| | | | | 50,000 |

The porosimeter readings versus the total absolute pressure may be plotted on four-phase semilog graph paper and the points connected using a French curve. The curve obtained provides an integral curve of pore diameter-cumulative pore volume which curve represents a profile of the apparent internal pore size distribution.

EXAMPLE 1

100 Parts by weight of NIPSIL VN-3 LP [trade name of finely divided silica manufactured and sold by Nippon Silica Industrial Co., Ltd., Japan (specific surface area: 280 m²/g, average diameter of particles: 16 m$\mu$) and 228 parts by weight of dioctyle phthalate (DOP) were mixed in a Henschel mixer and further mixed with 97 parts by weight of SUNTEC S-360 P [trade name of powdery high-density polyethylene manufactured and sold by Asahi Kasei Kogyo Kabushiki Kaisha, Japan (MW=110,000)] in this mixer.

By using a film-making apparatus including a twin extruder of 30 mm in diameter to which a T-die of 400 mm in width was attached, the blend thus obtained was extruded to form a film.

The extruded film was immersed in CHLOROTHENE VG (trade name of 1,1,1-trichloroethane manufactured and sold by Asahi Dow Ltd., Japan) for 5 minutes to extract DOP, followed by drying. Subsequently, the porous film was immersed in fuming sulfuric acid containing 25% by weight of free $SO_3$ at 40° C. for 5 minutes, followed by sufficient washing with water. The resulting porous film was further immersed in a 40% by weight aqueous solution of caustic soda at 60° C. for 5 minutes to extract the finely divide silica, followed by washing with water and drying.

The porous membrane thus obtained had an average pore diameter of 0.15$\mu$ and a porosity of 70%, and had an open pore structure with a network of meandering passages of the pores. The exchange capacity of the porous membrane was 0.17 milliequivalent per gram of the membrane. The tensile break strength and tensile break elongation of the membrane were 35 Kg/cm² and 150%, respectively, which demonstrated that the membrane was excellent in mechanical strength and elongation. The water permeability and water-permeability retention of the membrane were as excellent as 1,800 liters/m².hr.atm. and 100%, respectively. The removal capability of the porous membrane was as excellent as 100% when examined by using a latex containing polystyrene particles of 0.22$\mu$ in average diameter and 95% when examined by using a latex containing polystyrene particles of 0.1$\mu$ in average diameter.

EXAMPLE 2

A porous membrane was prepared in substantially the same manner as in Example 1 except that dioctyl phthalate (DOP) was used in an amount of 227 parts by weight instead of 228 parts by weight and SUNTEC S-360 P was used in an amount of 268 parts by weight instead of 97 parts by weight.

The porous membrane thus obtained had a porosity of 32% and an average pore diameter of 0.15$\mu$, and had an open pore structure with a network of meandering passages of the pores. The exchange capacity of the porous membrane was 0.07 milliequivalent per gram of the membrane. The tensile break strength and tensile break elongation of the porous membrane were 48 Kg/cm² and 180%, respectively, which proved that the porous membrane was excellent in mechanical strength and elongation. The water permeability of the porous membrane was 500 liters/m².hr.atm, and the water-permeability retention was 100%, which was the maximum value attainable. The removal capability of the porous membrane was as excellent as 100% when examined by using a latex containing polystyrene particles of 0.22$\mu$ in average diameter and 94% when examined by using a latex containing polystyrene particles of 0.1$\mu$ in average diameter.

EXAMPLE 3

A porous membrane was prepared in substantially the same manner as in Example 1 except that dioctyl phthalate (DOP) was used in an amount of 215 parts by weight instead of 228 parts by weight and SUNTEC S-360 P was used in an amount of 55 parts by weight instead of 97 parts by weight.

The porous membrane thus obtained had an average pore diameter of 0.15$\mu$ and a porosity of 82%, and had an open pore structure with a network of meandering passages of the pores. The exchange capacity of the porous membrane was 0.2 milliequivalent per gram of the membrane. The tensile break strength and tensile break elongation of the porous membrane were 15 Kg/cm² and 60%, respectively. The water permeability and water-permeability retention of the porous membrane were as excellent as 4,500 liters/m².hr.atm and 100%, respectively. The removal capability of the porous membrane was as excellent as 100% when examined by using a latex containing polystyrene particles of 0.22μ in average diameter and 95% when examined by using a latex containing polystyrene particles of 0.1μ in average diameter.

EXAMPLE 4

A porous membrane was prepared in substantially the same manner as in Example 1 except that SUNTEC B-180 P [trade name of powdery high-density polyethylene manufactured and sold by Asahi Kasei Kogyo Kabushiki Kaisha, Japan (Mw=250,000)] was used in place of SUNTEC S-360 P.

The porous membrane thus obtained had an average pore diameter of 0.1μ and a porosity of 65%, and had an open pore structure with a network of meandering passages of the pores. The exchange capacity of the porous membrane was 0.24 milliequivalent per gram of the membrane. The tensile break strength and tensile break elongation of the porous membrane were as excellent as 50 Kg/cm$^2$ and 150%, respectively. The water permeability and water-permeability retention of the porous membrane were as excellent as 1,500 liters/m$^2$.hr.atm and 100%, respectively. The removal capability of the porous membrane was as excellent as 100% when examined by using a latex containing polystyrene particles of 0.1μ in average diameter and 97% when examined by using a latex containing polystyrene particles of 0.085μ in average diameter.

EXAMPLE 5

A porous membrane was prepared in substantially the same manner as in Example 1 except that VITASIL V-220 [trade name of finely divided silica manufactured and sold by Taki Kagaku K.K., Japan (specific surface area: 150m$^2$/g, average diameter of particles: 0.03μ)] was used in place of NIPSIL VN-3 LP.

The porous membrane thus obtained had an average pore diameter of 0.4μ and a porosity of 65%, and had an open pore structure with a network of meandering passages of the pores. The exchange capacity of the porous membrane was 0.06 milliequivalent per gram of the membrane. The tensile break strength and tensile break elongation of the porous membrane were as excellent as 33 Kg/cm$^2$ and 200%, respectively. The water permeability and water-permeability retention of the porous membrane were as excellent as 1,700 liters/m$^2$.hr.atm and 100%, respectively. The removal capability of the porous membrane was as excellent as 100% when examined by using a latex containing polystyrene particles of 0.46μ in average diameter and 90% when examined by using a latex containing polystyrene particles of 0.33μ in average diameter.

EXAMPLE 6

A porous membrane was prepared in substantially the same manner as in Example 1 except that 240 parts by weight of dibutyl phthalate (DBP) and 93 parts by weight of NOBLEN AS171 A [trade name of powdery polypropylene manufactured and sold by Sumitomo Kagaku K.K., Japan (Mw=300,000)] were used in place of 228 parts by weight of dioctyl phthalate (DOP) and 97 parts by weight of SUNTEC S-360 P, respectively, and that fuming sulfuric acid containing 20% by weight of free SO$_3$ was used in place of fuming sulfuric acid containing 25% by weight of free SO$_3$.

The porous membrane thus obtained had an average pore diameter of 0.2μ and a porosity of 72%, and had an open pore structure with a network of meandering passages of the pores. The exchange capacity of the porous membrane was 0.35 milliequivalent per gram of the membrane. The tensile break strength and tensile break elongation of the porous membrane were 30 Kg/cm$^2$ and 50%, respectively. The water permeability and water-permeability retention of the porous membrane were as excellent as 2,700 liters/m$^2$.hr.atm and 100%, respectively. The removal capability of the porous membrane was as excellent as 100% when examined by using a latex containing polystyrene particles of 0.22μ in average diameter and 93% when examined by using a latex containing polystyrene particles of 0.176μ in average diameter.

COMPARATIVE EXAMPLE 1

A porous membrane was prepared in substantially the same manner as in Example 1 except that a porouss film as obtained in Example 1 after extraction of DOP and drying was immersed at 20° C. for 5 minutes in fuming sulfuric acid containing 20% by weight of free SO$_3$.

The porous membrane thus obtained had an average pore diameter of 0.15μ and a porosity of 70%, and had an open pore structure with a network of meandering passages of the pores. The exchange capacity of the porous membrane was 0.04 milliequivalent per gram of the membrane. Although the porous membrane showed an excellent mechanical strength and elongation of 33 Kg/cm$^2$ and 300% in terms of tensile break strength and tensile break elongation, respectively, the water permeability of the membrane was as poor as 0 liter/m$^2$.hr.atm. The removal capability of the membrane was also as poor as 15% when examined by using a latex containing polystyrene particles of 0.1μ in average diameter though it was 100% when examined by using a latex containing polystyrene particles of 0.22μ in average diameter. It should be noted that, only in this Comparative Example, the dilution of the latices was done with ethanol instead of distilled water since the membrane could not allow dispersions of the latices diluted with distilled water to pass therethrough.

COMPARATIVE EXAMPLE 2

A porous membrane was prepared in substantially the same manner as in Example 1 except that a porous film as obtained in Example 1 after extraction of DOP and drying was immersed at 50° C. for 15 minutes in fuming sulfuric acid containing 30% by weight of free SO$_3$.

The porous membrane thus obtained had an average pore diameter of 0.15μ and a porosity of 68%, and had an open pore structure with a network of meandering passages of the pores. The exchange capacity of the porous membrane was 1.2 milliequivalents per gram of the membrane. The removal capability of the porous membrane was as excellent as 100% when examined by using a latex containing polystyrene particles of 0.22μ in average diameter and 96% when examined by using a latex containing polystyrene particles of 0.1μ in average diameter. The water permeability of the porous membrane was also as excellent as 1,500 liters/m$^2$.hr.atm. However, the water- permeability retention of the porous membrane was as poor as 80%. The tensile break elongation of the porous membrane was only 5%, which was proof of the fragility of the membrane.

EXAMPLE 7

A porous membrane was prepared in substantially the same manner as in Example 1 except that dioctyl phthalate (DOP) was used in an amount of 240 parts by weight instead of 228 parts by weight and 93 parts by weight of TEFZEL (trade name of a copolymer of ethylene and tetrafluoroethylene manufactured and sold by E. I. duPont de Nemours and Company, U.S.A.) was used in place of 97 parts by weight of SUNTEC S-360 P.

The porous membrane thus obtained had an average pore diameter of $0.1\mu$ and a porosity of 60%, and had an open pore structure with a network of meandering passages of the pores. The exchange capacity of the porous membrane was 0.12 milliequivalent per gram of the membrane. The tensile break strength and tensile break elongation of the porous membrane were as excellent as 45 Kg/cm$^2$ and 150%, respectively. The water permeability and water-permeability retention of the porous membrane were as excellent as 1,350 liters/m$^2$.hr.atm and 100% respectively. The removal capability of the porous membrane was an excellent as 100% when examined by using a latex containing polystyrene particles of $0.1\mu$ in average diameter and 96% when examined by using a latex containing polystyrene particles of $0.085\mu$ in average diameter.

EXAMPLE 8

A porous membrane was prepared in substantially the same manner as in Example 1 except that a porous film as obtained in Example 1 after extraction of DOP and drying was immersed at 23° C. for 2 hours in chlorosulfonic acid instead of fuming sulfuric acid containing 25% by weight of free SO$_3$.

The porous membrane thus obtained had an average pore diameter of $0.15\mu$ and a porosity of 74%, and had an open pore structure with a network of meandering passages of the pores. The exchange capacity of the porous membrane was 0.12 milliequivalent per gram of the membrane. The tensile break strength and tensile break elongation of the porous membrane were as excellent as 35 Kg/cm$^2$ and 90%, respectively. The water permeability and water-permeability retention of the porous membrane were as excellent as 1,700 liters/m$^2$.hr.atm and 100%, respectively. The removal capability of the porous membrane was as excellent as 100% when examined by using a latex containing polystyrene particles of $0.22\mu$ in average diameter and 93% when examined by using a latex containing polystyrene particles of $0.1\mu$ in average diameter.

EXAMPLE 9

A porous film as obtained after extraction of DOP and drying was prepared in the same manner as in Example 1. The porous film was immersed in a 40% by weight aqueous solution of caustic soda at 60° C. for 5 minutes to extract the finely divided silica from the film, followed by washing with water and drying. The resulting film was immersed in a 2% by weight methanol solution of NISSAN NONION HS-204.5 (trade name of a nonion surface active agent sold by Nihon Yushi K.K., Japan) at 20° C. for 30 minutes, followed by drying. Subsequently, the film was immersed at 40° C. for 5 minutes in fuming sulfuric acid containing 25% by weight of free SO$_3$, followed by neutralization with a 1N aqueous solution of caustic soda. The porous membrane thus obtained was then sufficiently washed with water and dried.

The porous membrane had an average pore diameter of $0.15\mu$ and a porosity of 71%, and had an open pore structure with a network of meandering passages of the pores. The exchange capacity of the porous membranes of 0.17 milliequivalent per gram of the membrane. The tensile break strength and tensile break elongation of the porous membrane were as excellent as 35 Kg/cm$^2$ and 150%, respectively. The water permeability and water-permeability retention of the porous membrane were as excellent as 1,800 liters/m$^2$.hr.atm and 100%, respectively. The removal capability of the porous membrane was as excellent as 100 when examined by using a latex containing polystyrene particles of $0.22\mu$ in average diameter and 95% when examined by using a latex containing polystyrene particles of $0.1\mu$ in average diameter.

What is claimed is:

1. A water permeable porous membrane which consists essentially of a sulfonated polyolefin selected from the group consisting of sulfonated polyethylene, sulfonated polypropylene, sulfonated polybutene and mixtures thereof and sulfonated copolymers of two or more kinds of monomers selected from ethylene, propylene, butene, hexene and tetrafluoroethylene, said polyolefin contains sulfonic groups in an amount, in terms of exchange capacity, of 0.05 to 1 milliequivalent per gram of the sulfonated polyolefin and has a porosity of 30 to 85% and an average pore diameter of 0.05 to $1\mu$.

2. A porous membrane as claimed in claim 1, wherein said sulfonic groups are present substantially only in the outer surfaces of the membrane and the inner surfaces surrounding the pores.

3. A process for preparing a water permeable porous membrane having a porosity of 30 to 85% and an average pore diameter of 0.05 to $1\mu$, which comprises treating, with a sulfonating agent selected from the group consisting of fuming sulfuric acid, chlorosulfonic acid, 100% sulfuric acid and solutions of sulfur trioxide dissolved in a suitable solvent a porous membrane consisting essentially of an inorganic filler and a polyolefin selected from the group consisting of polyethylene, polypropylene, polybutene and mixtures thereof and copolymers of two or more kinds of monomers selected from ethylene, propylene, butene, hexene and tetrafluoroethylene, the treatment being carried out so that the resulting sulfonated polyolefin contains sulfonic groups in an amount, in terms of exchange capacity, of 0.05 to 1 milliequivalent per gram of the sulfonated polyolefin, and extracting the inorganic filler.

4. A process for preparing a water permeable porous membrane having a porosity of 30 to 85% and an average pore diameter of 0.05 to $1\mu$, which comprises treating, with a sulfonating agent selected from the group consisting of fuming sulfuric acid, chlorosulfonic acid 100% sulfuric acid and solutions of sulfur trioxide dissolved in a suitable solvent, a porous membrane consisting essentially of a polyolefin selected from the group consisting of polyethylene, polypropylene, polybutene and mixtures thereof and copolymers of two or more kinds of monomers selected from ethylene, propylene, butene, hexene and tetrafluoroethylene, the treatment being carried out so that the resulting sulfonated polyolefin contains sulfonic groups in an amount, in terms of exchange capacity, of 0.05 to 1 milliequivalent per gram of the sulfonated polyolefin.

* * * * *

UNITED STATES PATENT AND TRADEMARK OFFICE
CERTIFICATE OF CORRECTION

PATENT NO. : 4,409,339

DATED : October 11, 1983

INVENTOR(S) : KAZUO MATSUDA ET AL

It is certified that error appears in the above-identified patent and that said Letters Patent is hereby corrected as shown below:

Claim 1, line 8, change "contains" to --- containing ---.

Claim 1, line 10, change "has" to --- having ---.

Claim 3, line 7, change "solvent" to --- solvent, ---.

Claim 4, line 5, change "chlorosulfonic acid" to --- chlorosulfonic acid, ---.

Signed and Sealed this

Sixth Day of August 1985

[SEAL]

Attest:

DONALD J. QUIGG

Attesting Officer   Acting Commissioner of Patents and Trademarks